United States Patent [19]

Wawra et al.

[11] Patent Number: 5,014,831
[45] Date of Patent: May 14, 1991

[54] DEVICE FOR LOCKING AN ACTUATING LEVER OF A SHIFTING DEVICE

[75] Inventors: Helmut Wawra, Korb; Wilhelm Albrecht, Vaihingen/Enz; Bernd Wagner, Kernen; Andreas Franke, Stuttgart; Harald Gellner, Marbach, all of Fed. Rep. of Germany

[73] Assignee: Daimler-Benz AG, Fed. Rep. of Germany

[21] Appl. No.: 448,996

[22] Filed: Dec. 12, 1989

[30] Foreign Application Priority Data

Dec. 16, 1988 [DE] Fed. Rep. of Germany ....... 3842333

[51] Int. Cl.$^5$ ............................................. B60K 41/00
[52] U.S. Cl. ..................................... 192/4 A; 192/4 C
[58] Field of Search ................. 192/4 A, 4 C; 74/878; 70/247, 389; 180/271

[56] References Cited

U.S. PATENT DOCUMENTS

| 3,942,614 | 3/1976 | Thompson | 192/4 A |
|---|---|---|---|
| 4,004,665 | 1/1977 | Guhl et al. | 192/4 A |
| 4,096,930 | 6/1978 | Viscardi | 192/4 A |
| 4,235,123 | 11/1980 | Simancik et al. | 70/247 |
| 4,473,141 | 9/1984 | Mochida | 192/4 A |
| 4,496,035 | 1/1985 | Wanie | 192/4 C |
| 4,572,340 | 2/1986 | Pierce | 192/4 A |
| 4,660,443 | 4/1987 | Simancik | 192/4 A |
| 4,821,605 | 4/1989 | Dzioba | 192/4 A |
| 4,887,702 | 12/1989 | Ratke et al. | 74/878 |
| 4,905,802 | 3/1990 | Gotoh | 192/4 A |

Primary Examiner—Allan D. Herrmann
Assistant Examiner—Nicholas Whitelaw
Attorney, Agent, or Firm—Evenson, Wands, Edwards, Lehanan & McKeown

[57] ABSTRACT

A device for locking an actuating lever of a shifting device of a gear-change mechanism of a motor vehicle, in a lever position associated with a particular shift state utilizes a swivellable locking element connected to a brake pedal via an adjusting linkage to be moved into a locking position by a restoring spring holding the brake pedal in the unactuated rest position. Depression of the brake pedal releases the actuating lever. The adjusting linkage contains a resiliently-acting intermediate member acting on the locking element control to position a counter-control cam into engagement with an actuator control cam to lock the actuator. When the actuating lever is actuated into a nonlockable lever position, the locking element is moved into a floating position against the spring force of the intermediate member, while the brake pedal remains essentially in a rest position by virtue of an enlargement of the effective length of the adjusting linkage.

20 Claims, 5 Drawing Sheets

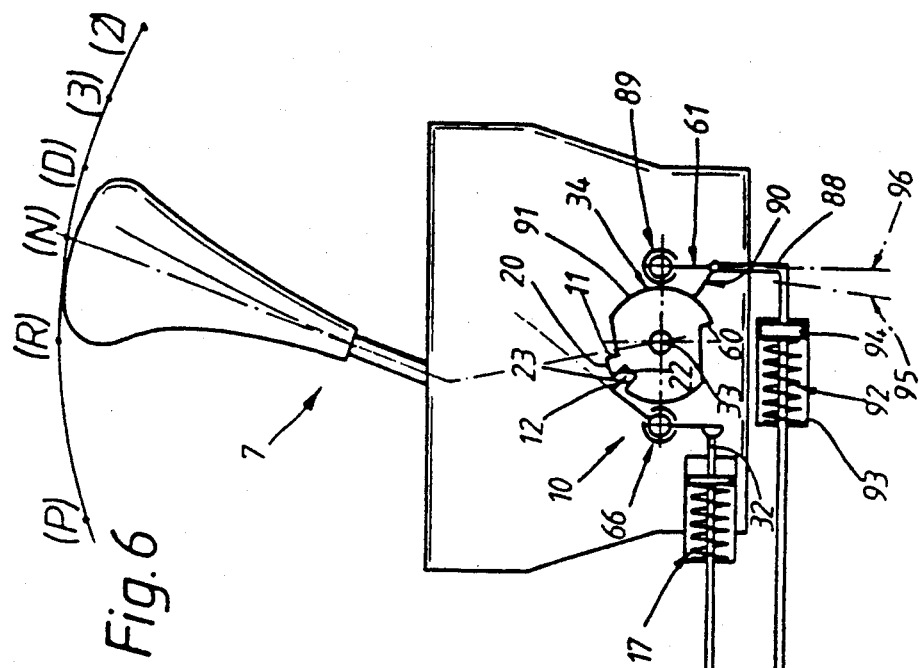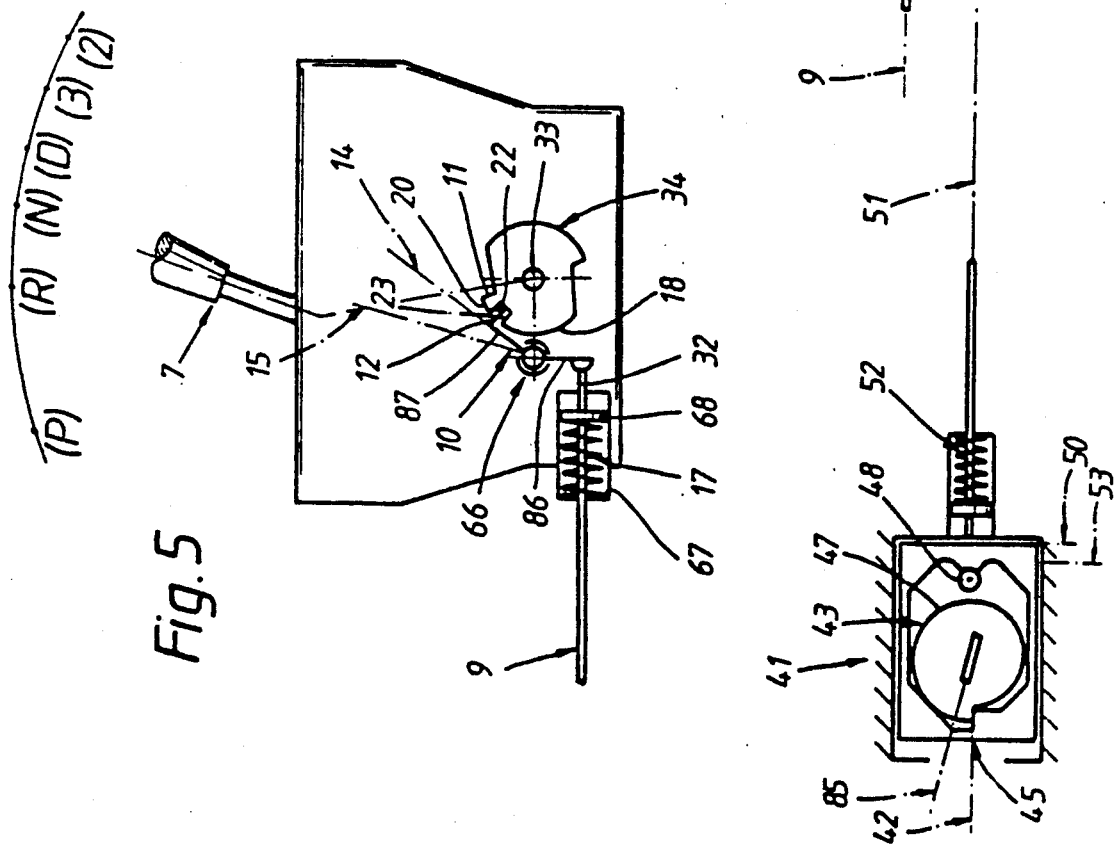

DEVICE FOR LOCKING AN ACTUATING LEVER OF A SHIFTING DEVICE

BACKGROUND AND SUMMARY OF THE INVENTION

The invention relates to a device for locking a swiveling actuating lever of a shifting device of a gear-change mechanism of a motor vehicle in a lever position associated with a particular shift state as a function of the position of a brake pedal. The swivellably mounted actuating lever is in operative connection with a counter-blocking locking element moved by brake pedal via a mechanical adjusting linkage. The actuating lever is provided with a blocking member that cooperates with the counter-blocking locking element. The locking element can be moved by a restoring spring, holding the brake pedal in an unactuated rest position, into a locking position holding the blocking and counter-blocking members in engagement. When the brake pedal is depressed, the spring force of the restoring spring is overcome and the linkage is moved into a floating position bringing the blocking and counter-blocking members out of engagement. The adjusting linkage contains a resiliently-acting intermediate member for changing the effective linkage length and the intermediate member is designed with lower spring forces than the restoring spring. The actuating lever has at least one nonlockable lever position associated with a particular shift state(s) where the blocking and counter-blocking members are disengaged. In the unactuated rest position of the brake pedal, the locking element is held in its floating position by actuation of the actuating lever between nonlockable lever positions and the spring force of the intermediate member is overcome to change the linkage length of the adjustable linkage. Thus the pedal can remain in its rest position.

In a known device of this general kind (U.S. Pat. No. 4,096,930), a manual selector of an automatic gear-change mechanism is mounted as a steering column shift on a vehicle steering column. The arrangement is such that the brake pedal is articulatedly connected to a connecting rod which leads to the manual selector lever and is connected by a resiliently-acting intermediate member (in the form of a prestresses compression spring) to a locking pin which can move into two receiving holes of a locking disk firmly connected to the manual selector lever. One of the receiving holes is aligned with the locking pin in the park position and the other in the neutral position of the manual selector lever. Unlocking of the manual selector lever is accomplished by depressing the brake pedal, which, due to its articulated connection to the connecting rod, provides a positive coupling with the locking pin.

Due to the use of a rigid connecting rod, this construction is not readily suitable for the locking of a manual selector lever arranged in the manner of a floor shift on the transmission tunnel because, by its very nature, a simple connecting rod cannot be accommodated between the brake pedal and such a manual selector lever. Also if, as a consequence of an accident or the like, the connecting rod is damaged, there is the risk that the manual selector lever will be impossible to unlock and/or the brake pedal will be impossible to actuate.

The object on which the invention is based consists essentially in creating a device for locking the actuating lever of a shifting device of a gear-change mechanism, arranged as a floor shift next to the driver's seat as a function of the position of the brake pedal, wherein the actuating lever can also assume nonlockable lever positions and wherein hydraulic means are not used (for safety reasons) and a breakage of mechanical linkage elements cannot lead to an impairment of the shifting device.

The object of the invention is achieved in an advantageous manner by having an adjusting linkage of flexible design and the locking element be swivellably mounted and actuable by a resilient means into a floating position. The spring forces of the resilient means are less than the spring forces of a resilient intermediate member connecting the brake pedal to the locking element. The resiliently-acting intermediate member has two levers which are mounted about a common swivelling axis and are relatedly held to one another by the spring forces and by a stop and counter-stop means. One of the levers can be brought into engagement with the brake pedal and the linkage end of the adjusting linkage which is associated with the brake pedal cooperates with the other lever.

The locking mechanism is located at the actuating lever and consists of a cam disk part which is arranged concentrically to the swivelling axis of the lever to be moveable therewith. The disk has blocking and control cams which cooperate with the locking element connected to the brake pedal. For installment adjusting purposes the one lever of the intermediate member (associated with the brake pedal) is connected both by a releasable frictional connection and by an adjusting spring to a cam lever mounted so as to be swivellable about the common swivelling axis of the intermediate lever. With the frictional connection released, a lever moment which brings the cam lever up against the brake pedal, is obtained by fixing the one lever of the intermediate member relative to a part fixed to the vehicle.

As an extra desirable feature the locking element can be actuated into its floating position, irrespective of the position of the brake pedal. Here an electromagnet operates as a function of the driving speed to provide the additional control. The electromagnet, is arranged in proximity to the brake pedal and acts on a linkage part connecting the resiliently-acting intermediate member to the locking element.

A still further extra feature is to have the actuating lever lockable in park position as a function of the position of an ignition lock. The ignition lock is provided with a single fixed angular key withdrawal position. A camshaft part is actuable by turning of the ignition key and has a blocking cam that cooperates with a locking slide displaceable perpendicularly to the axis of rotation of the camshaft part. The slide has a corresponding counter-blocking cam. The camshaft part also has control cam surfaces and the locking side a corresponding counter-control cam surface. When the ignition lock is actuated by a key in the direction of a driving position, the locking slide moves into a locking position in which the counter-blocking cam lies in the path of motion of the blocking cam and thereby blocks the key from returning to its withdrawal position unless the actuating lever is in the park position. The control between the ignition lock and the actuating lever includes a flexible mechanical adjusting linkage cooperating with the locking slide through a resilient means which can move the locking slide into a floating position in which its counter-blocking cam lies outside the path of motion of the blocking cam. Here the lock cylinder core is thus free to reach the key withdrawal position. The resilient means for the floating position of the locking slide is designed with higher spring forces than the resilient means for the adjustable linkage connection to the locking element. The adjusting linkage of the locking slide is connected to the intermediate lever through a lost motion connection that allows the intermediate lever to be positioned differentially with respect to the locking slide. The swivellable locking element can be actuated into its locking position by the resilient means of the locking slide.

The lost motion idle path of the linkage connection is operative when the brake pedal is in its rest position and, simultaneously, both the swivellable locking element and the locking slide are each in their respective locking positions.

When the swivellable locking element is actuated into its floating position by the actuating lever moving out of park, the locking slide prevents key withdrawal. It is possible to actuate the lock into its key withdrawal position, irrespective of the position of the brake pedal, only when the actuating lever is in park position. Also and irrespective of the position of the brake pedal, the actuating lever is locked in its park position when the lock is in its key withdrawal position.

Alternatively, the actuating linkage for the locking mechanism can operate on the locking member of the actuating lever directly rather than going through the intermediate lever. Here also a lost motion connection is utilized. A second bias spring can be provided at the end of the linkage adjacent the locking mechanism to allow for key locking control in other than a parking position. To that end a control cam on the locking means is provided between two blocking cams associated with the actuating lever to provide for a nonlockable lever position lying between two lockable lever positions.

While the embodiments are chiefly directed at the use of the invention for a practical installation of components in proximity to the brake pedal, functional advantages are also achieved by some of the further developments, such as: an additional ignition lock-dependent locking of the park position; an additional brake-pedal-dependent locking at a neutral position; and a driving-speed-dependent prevention of the locking at the neutral position.

Other objects, advantages and novel features of the present invention will become apparent from the following detailed description of the invention when considered in conjunction with the accompanying drawings.

BRIEF DESCRIPTION OF THE DRAWINGS

FIG. 5 is the schematic representation of a cutaway portion limited to the difference, of a fifth embodiment of the device of FIG. 1, said difference being directed at the additional locking in the neutral position; and FIG. 6 is the schematic representation of a sixth embodiment of a locking device of FIG. 5 wherein locking of the park position is additionally caused as a function of the position of an ignition lock.

DETAILED DESCRIPTION OF THE DRAWINGS

Figure 1:
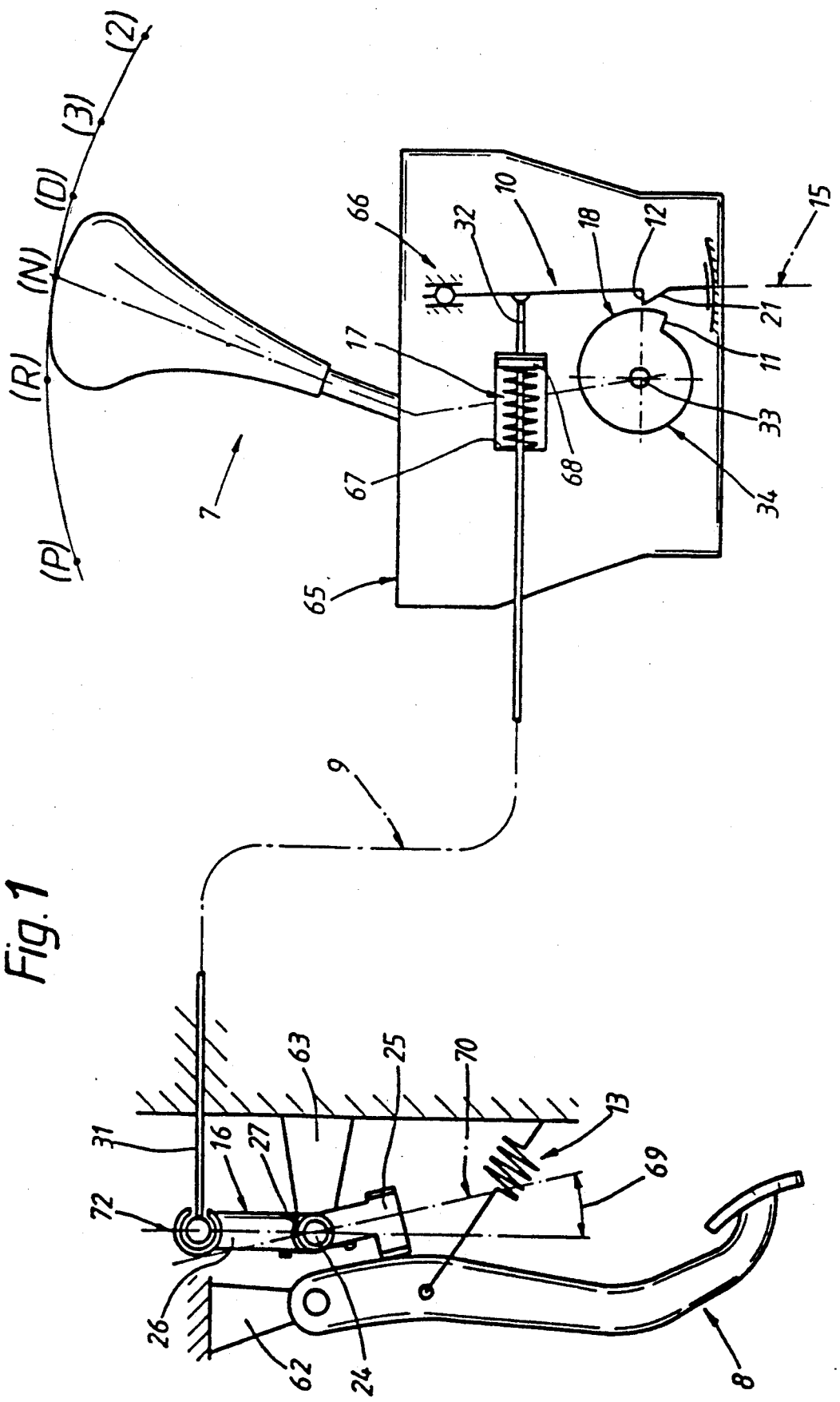
FIG. 1 is the schematic first embodiment representation of a locking device for locking the park position of a selector lever of an automatic shifting device of a gear-change mechanism of a motor vehicle in response to the position of a brake pedal.

The individual embodiments which have the same features or functions have the same reference numeral in order to avoid repetition.

With reference to the embodiment of FIG. 1, a brake pedal 8 operates a resiliently-acting intermediate member 16 coupled to a flexible mechanical adjusting linkage 9 for transmission of tensile and compressive forces from said brake to a locking element 10 of a gear selector lever 7. The brake pedal 8 and intermediate member 16 are each swivellably mounted by means of a bearing bracket 62 and 63 attached to the vehicle. The brake pedal 8 is held by the customary restoring spring 13 in its rest position as drawn. The intermediate member 16 comprises two levers 25 and 26, swivellably mounted about a common swivelling axis 24. A torsion spring 27 holds the levers essentially in an extended mutual stop position and is designed with lower spring forces than the restoring spring 13.

In a known manner, the gear selector lever 7 forms part of an automatic shifting device of the gear-change mechanism and is thus actuable into the customary positions (P), (R), (N), (D), (3) and (2). For this purpose, the selector lever 7 is mounted so as to be swivellable about a swivelling axis 33 fixed in relation to a transmission tunnel 65 extending next to the driver's seat.

The selector lever 7 can furthermore be locked in its park position (P) as a function of the position of the brake pedal 8. The locking is accomplished through end 32 of the adjusting linkage 9 (situated in proximity to the selector lever 7) being articulatedly connected to locking element 10, which in turn is swivellably mounted in proximity to the selector lever 7 by means of a joint 66 on the transmission tunnel 65.

The selector lever 7 has a cam disk part 34 arranged concentrically to its swivelling axis 33. The disk part 34 has blocking cam 11 and a control cam 18. In corresponding fashion, a counter-blocking cam 12 and a counter-control cam 21 are formed on the locking element 10. When the selector lever 7 is in one of its non-lockable positions (E.G. the shown neutral position (N)), the locking element 10 will have been moved by engagement of control cam 18 and counter-control cam 21 into a floating position 15 in which blocking cam 11 and counter-blocking cam 12 are out of engagement. In this floating position 15, the locking element 10 is also actuable by resilient means 17. Resilient means 17 is held between an abutment 67 fixed to the vehicle and a spring plate 68 fixed in relation to the linkage end 32 and is designed with a lower spring force than the torsion spring 27.

The resiliently-acting intermediate member 16 makes it possible for the brake pedal 8 (in so far as it is not actuated to produce vehicle braking) to remain in its rest position when the locking element 10 is brought into its floating position 15. During this procedure, the lever 26 is swivelled by the adjusting linkage 9 through a differential angle of rotation 69 relative to the other lever 25, which remains up against the brake pedal 8 as the torsion spring 27 is tensioned. The torsion spring 27 is weaker than the restoring spring 13 which controls.

When the gear selector lever 7 is actuated into its park position (P), control and counter-control cams 18 and 21 move out of engagement with each other. The locking element 10 is thereby actuated by the torsion spring 27, operating against the weaker resilient means 17, into a locking position 14 (FIGS. 4a and 4d) in which blocking cam 11 and counter-blocking cam 12 are in mutual engagement and the levers 25 and 26 are again in their extended mutual stop position 70.

Release of the gear selector lever 7 from the park position (P) is only possible by depressing the brake pedal 8, so that the resilient means 17 can move to the right to actuate the locking element 10 into the floating position 15.

Figure 2:
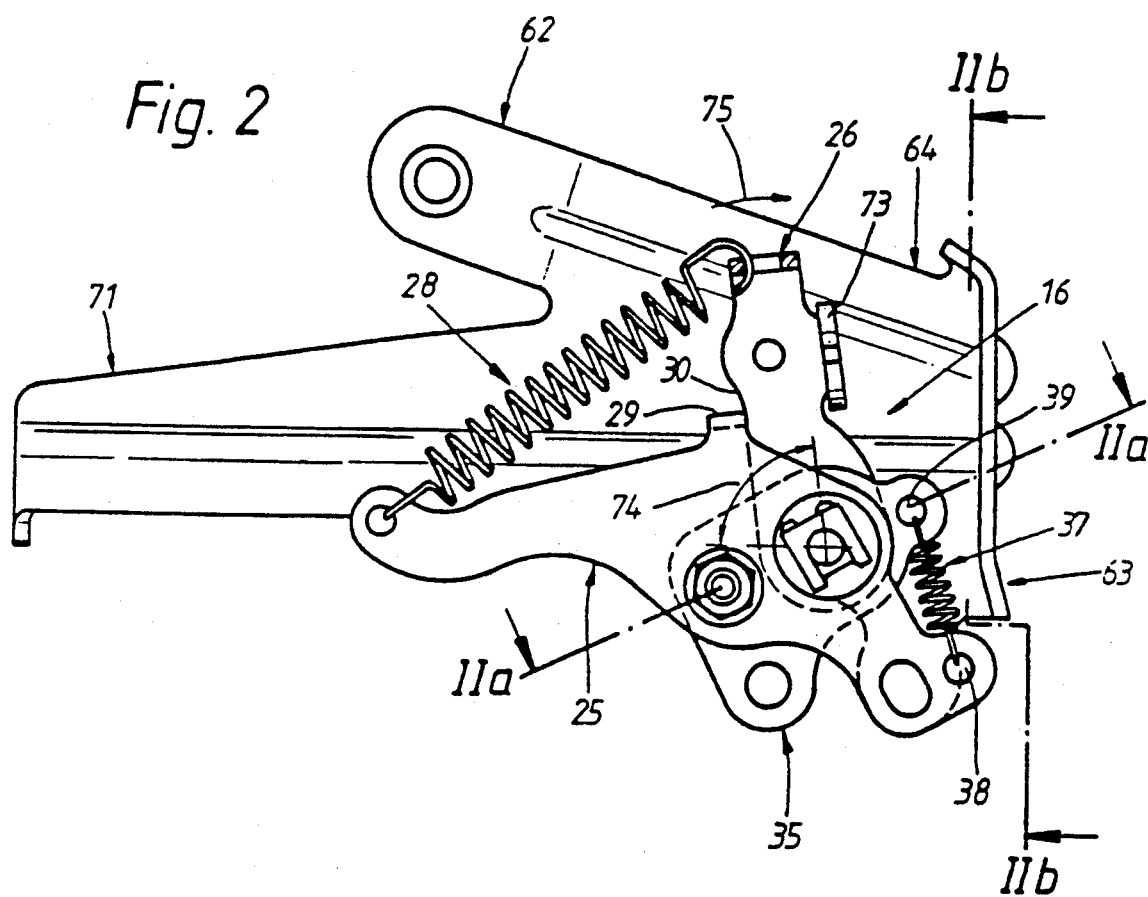
FIG. 2 is a more detailed representation of a second embodiment of the locking device of FIG. 1.
Figure 2A:
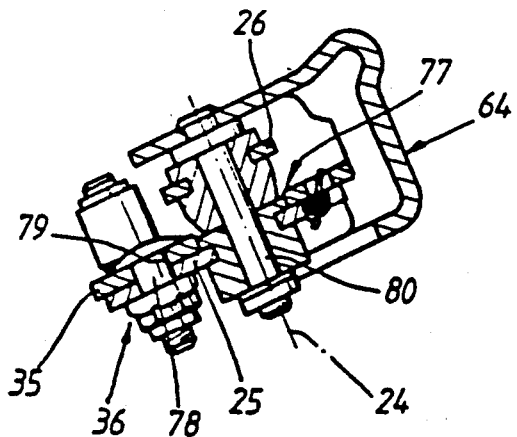
FIG. 2a is a section through the locking device of FIG. 2 in accordance with the line IIa—IIa.
Figure 2B:
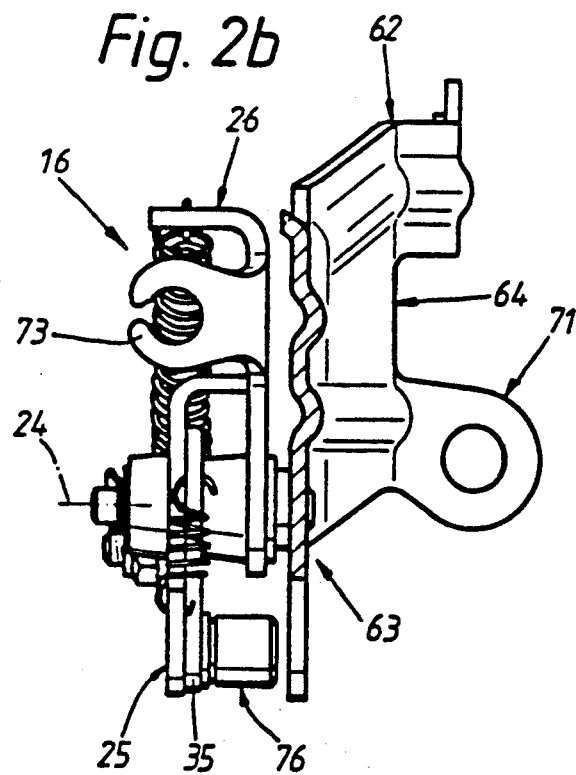
FIG. 2b is a section through the locking device of FIG. 2 in accordance with the line IIb—IIb in FIG. 2.

Details of another interconnection of brake pedal 8 and intermediate lever 16 are shown in FIGS. 2, 2a and 2b. The bearing brackets 62 and 63 for the brake pedal 8 and for the resiliently-acting intermediate member 16 are formed from a sheet steel stamping 64, which has a mounting portion 71 integral therewith for securement to the vehicle. In this embodiment, the levers 25 and 26 are held by a tension spring 28 in the mutual stop position 74 determined by stop and counter-stop means 29 and 30. As in the first embodiment (FIG. 1) linkage end 31 of the adjusting linkage 9 (adjacent the brake pedal 8) is secured on the lever 26 by means of a ball-and-socket joint 72 (FIG. 3) (of which only the socket 73 is drawn in FIGS. 2 and 2b). In the embodiments of FIG. 2, when the locking element 10 (FIG. 1) is actuated into the floating position 15, lever 26 is pivoted along in arrow direction 74 (relative to lever 25) by the linkage end 31 in order to obtain the necessary extension of the effective length of the adjusting linkage 9 in order that the brake pedal 8 remains in its rest position.

In order to be able to adjust (during assembly) that portion of the lever 25 that cooperates with the brake pedal 8, its connection with the pedal is provided in the form of a rotatable roller 76, which is brought up against the brake pedal 8. The roller 76 is mounted on a cam lever 35 mounted on the lever 25 by means of a hub mounting 77 so as to be swivellable about the swivelling axis 24. The cam lever 35 is connected to the lever 25 by a releasable frictional screwed connection 36. The screw bolt 78 of this connection passes through a guide slot 79 in the cam lever 35 which is concentric to the swivelling axis 24. A cylindrical helical tension adjusting spring 37 generates a lever moment at the cam lever 35 which brings the roller 76 up against the brake pedal 8 when the lever 25 has been fixed in a particular assembly position relative to a vehicle part and the screwed connection 36 has been released. Adjusting spring 37 is hooked into corresponding eyes 38 and 39 of the lever 25 and the cam lever 35. A bearing pin 80, held in the sheet steel stamping 64 and on which the levers are arranged to swivel by an associated hub, is used for mounting the levers 25 and 26 and defines axis 24.

Figure 3:
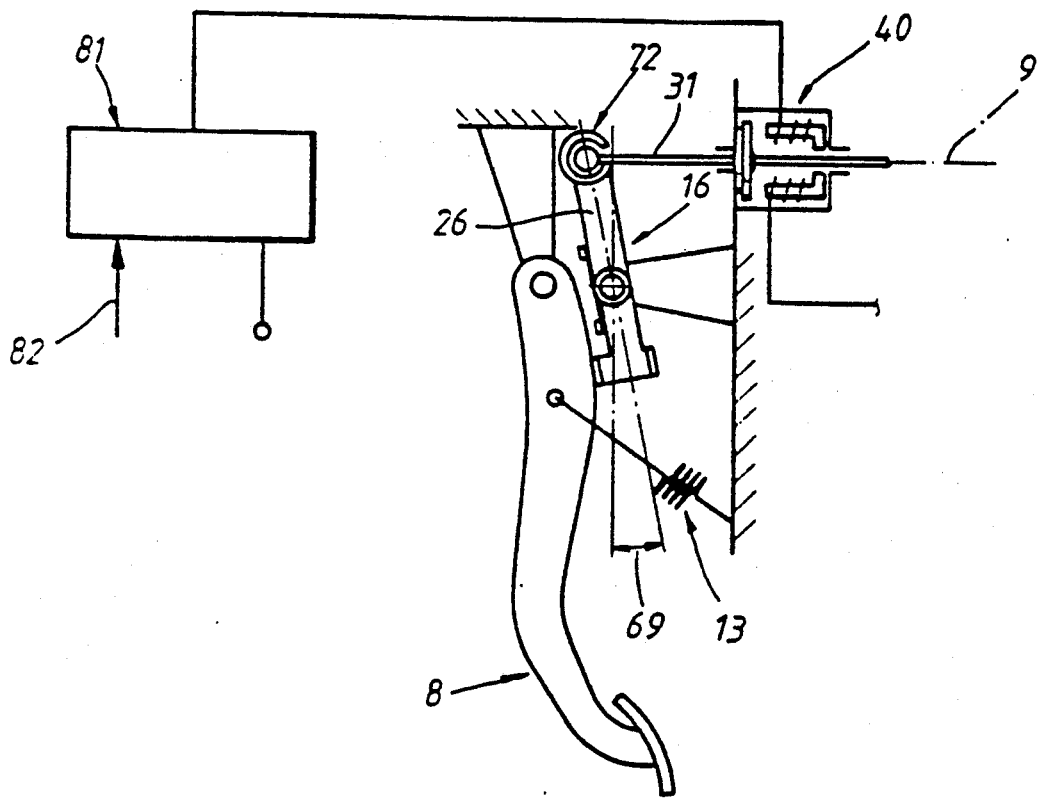
FIG. 3 is the schematic representation of a third embodiment of the invention of the locking device of FIG. 1 by means of a cutaway portion limited to the difference.

In the embodiment of FIG. 3, an electromagnet 40 (energized as a function of the driving speed) operates on that end of linkage 31 of the adjusting linkage 9 which is connected to the intermediate member 16 via the ball and joint 72. At a driving speed greater than about 1.5 km/h, lever 26 is actuated by the differential angle of rotation 69 into the position in which the resilient means 17 for actuating the locking element 10 into its floating position 15 is released (moved to the left in FIG. 1). For this purpose, the electromagnet 40 is connected to an electronic control device 81 which processes an input signal 82 dependent on the driving speed. In this arrangement, when the relevant threshold value of the driving speed is exceeded, the electromagnet 40 is controlled independently of whether or not the brake pedal 8 is in its rest position which is maintained essentially by the restoring spring 13. This embodiment is used when it is desired to lock the selector lever 7 in a neutral position (N).

Figure 4:
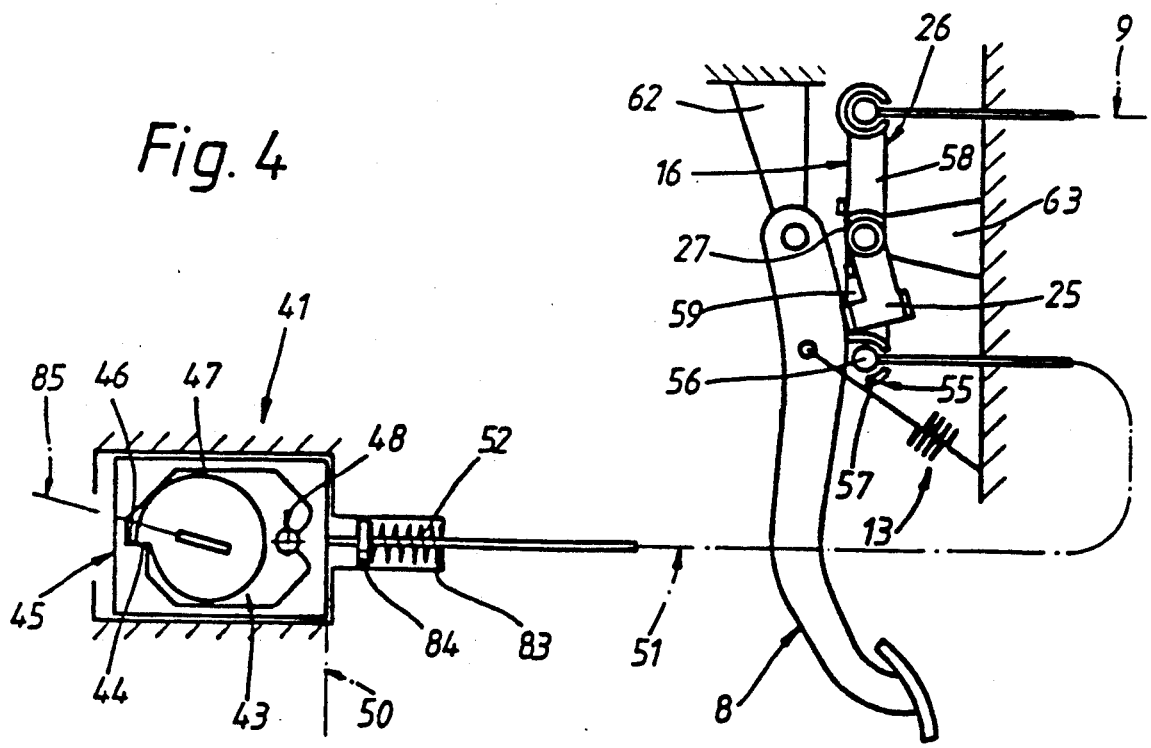
FIG. 4 is the schematic representation of a fourth embodiment of a locking device for the park position of a selector lever of an automatic shifting device of a gear-change mechanism of a motor vehicle, which operates as a function both of the position of a brake pedal and of the position of an ignition lock.

In the embodiment of FIG. 4, the park position (P) is additionally lockable as a function of the position of an ignition lock. An ignition-lock-dependent locking device 41 is coupled to the adjusting linkage (FIG. 2) associated with the brake pedal 8, at a point on resiliently-acting intermediate member 16, via an associated flexible mechanical linkage 51 that transmits tensile and compressive forces. In this arrangement, this coupling is effected in such a way that lever 26 of the intermediate member 16, which is connected to the adjusting linkage 9, is designed as a two-armed reversing lever. One lever arm 58 is connected to the adjusting linkage 9 and the other lever are 59 is connected to the adjusting linkage 51 via a sliding joint 55 providing a lost motion connection (differential angle of rotation 54 in FIG. 4a). In turn, lever 26 acts via the torsion spring 27 on lever 25, which can be brought up against the brake pedal 8 when the latter is in its rest position as maintained by the restoring spring 13.

To achieve the lost motion idle path 54, the ball joint 56 of the sliding joint 55 is guided in known manner so as to be displaceable relative to its joint socket 57.

The ignition lock has a lock cylinder core which is coupled to a coaxial camshaft part 43 of the locking device 41 and can be actuated by the ignition key between a key withdrawal position 42 and a driving position 49 (see FIGS. 4a–4d). The locking device 41 has a frame-shaped locking slide 45 (through which the camshaft part 43 passes) and is mounted so as to be displaceable perpendicularly to the axis of rotation of the camshaft part 43. The camshaft part 43 is provided with a blocking cam 44 and a control cam 47 while the locking slide 45 is provided in corresponding fashion with a counter-blocking cam 46 and a counter-control cam 48. When the ignition lock is actuated into the driving position 49, the locking slide 45 is displaced by the engagement of control cam 47 and counter-control cam 48 into a locking position 50 (FIG. 4), in which the counter-blocking cam 46 lies in the path of motion of the blocking cam 44. Here the key withdrawal position 42 (FIG. 4d) is thereby blocked as the key slot of the lock cylinder cannot rotate to a horizontal position.

While one linkage end of the adjusting linkage 51 is connected to the lost motion sliding joint 55, the other linkage end cooperates with the locking slide 45. A resilient means 52 is held between an abutment 83 fixed to the vehicle and a spring plate 84 fixed in relation to the relevant linkage end. In the floating position 53 (FIG. 4d), the counter-blocking cam 46 does not lie in the path of motion of the blocking cam 44, with the result that the horizontal key withdrawal position 42 of the lock cylinder core is reached.

The correlation between the various springs is as follows: The resilient means 52 for the floating position 53 of the locking slide 45 is designed with larger spring forces than the resilient means 17 for the floating position 15 of the locking element 10. The torsion spring 27 of the intermediate member 16 is designed with larger spring forces than the resilient means 17 for the floating position 15 of the locking element 10. The restoring spring 13 is designed with larger spring forces than the torsion spring 27 of the intermediate member 16.

Figure 4A:
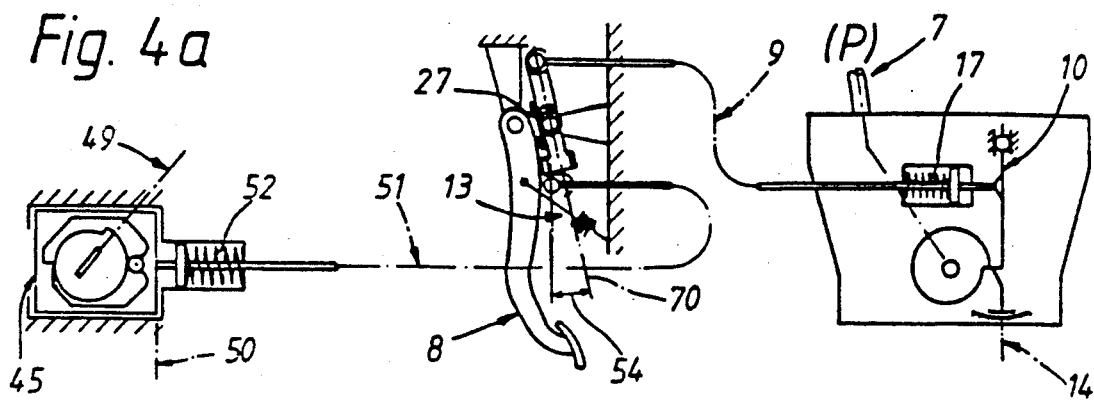
FIGS. 4a to 4d are the representation of four different positions of the locking device of FIG. 4.

The correlation of the effective linkage lengths and of the lost motion idle path with the two possible positions of locking element 10 and locking slide 45 is as follows:

When, in accordance with FIG. 4a, the selector lever 7 is in the park position (P), the brake pedal 8 is in the rest position, and the ignition lock is in the driving position 49, both the locking element 10 and the locking slide 45 are in their respective locking position 15 and 50. The lost motion idle path (differential angle of rotation 54) is fully effective because the resilient means 52 are compressed by the actuating forces of the locking slide 45 and the resilient means 17 are compressed by the restoring spring 13 (the two levers 25 and 26 are here held by the torsion spring 27 in the extended mutual stop position 70).

Figure 4B:
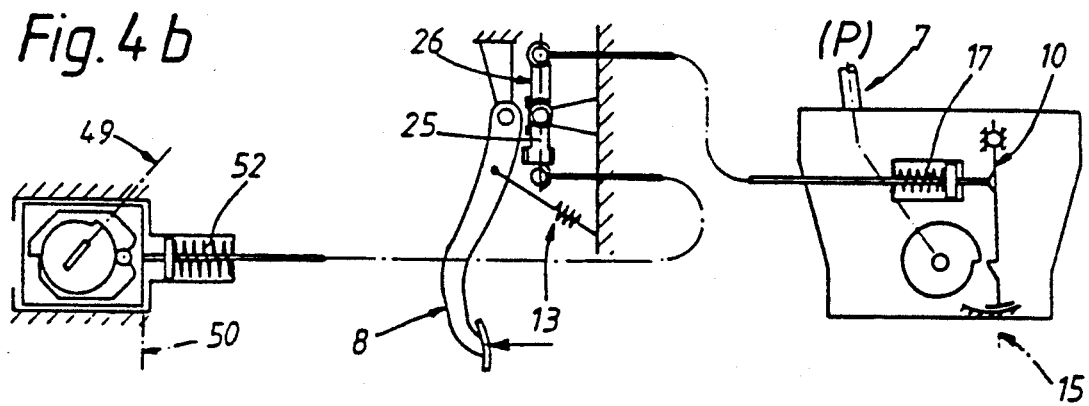

In turn, when, according to FIG. 4b, the selector lever 7 is in the park position (P), the ignition lock is in the driving position 49 and the brake pedal 8 has been depressed (the spring force of the restoring spring 13 being overcome), the locking element 10 is actuated into its floating position 15 by the resilient means 17 since the counter effect of the restoring spring 13 is no longer present. The ignition lock remains in its driving position 49. This ignition lock position is possible by using up the lost motion connection (differential angle of rotation 54).

Figure 4C:
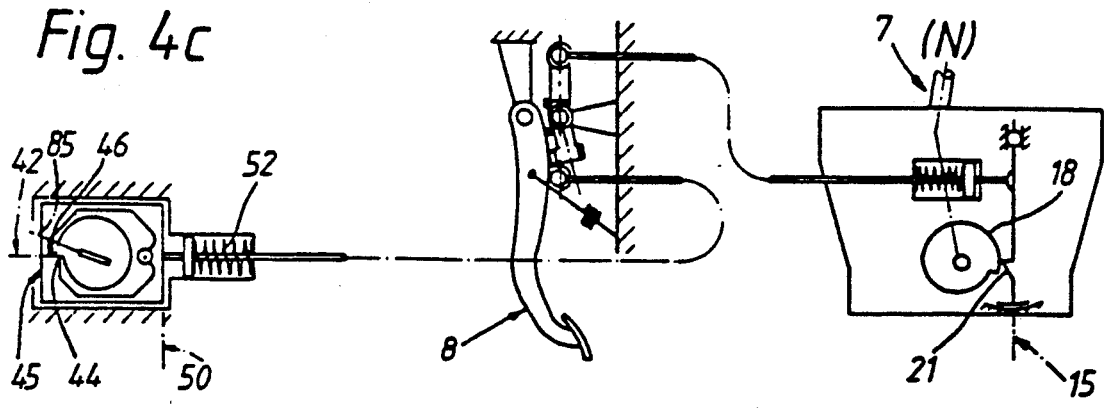

When according to FIG. 4c, the selector lever 7 has been actuated into the neutral position (N), the brake pedal 8 is in its rest position and an attempt is made to turn the ignition lock out of its driving position 49 into the direction of the key withdrawal position 42, blocking cam 44 and counter-blocking cam 46 move into engagement as the cam is rotated counter clockwise by the ignition key. The lock cylinder core is blocked in a blocking position 85 before reaching the key withdrawal position 42 because the resilient means 52 are disengaged from the locking slide 45 by the engagement of control cam 18 and counter-control cam 21.

Figure 4D:
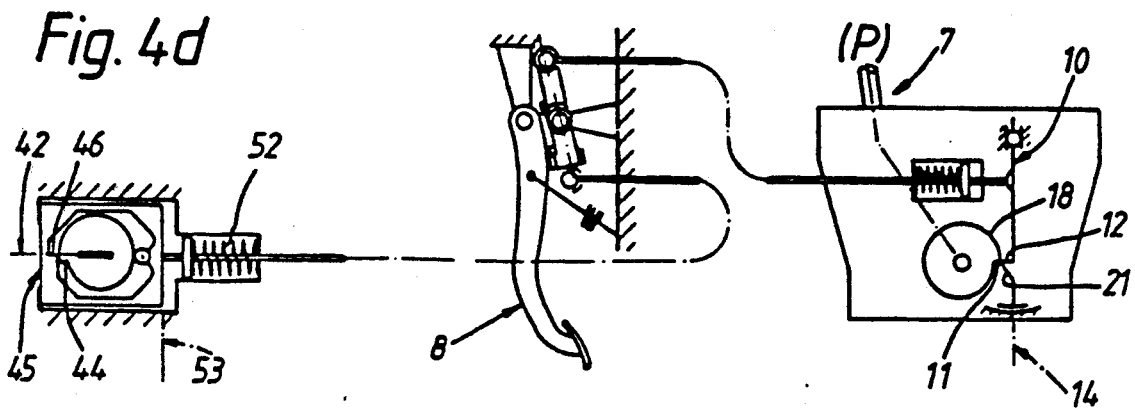

On the other hand, if in the locking state of FIG. 4c, the selector lever 7 is now actuated in accordance with FIG. 4d into the park position (P), control cam 18 and counter-control cam 21 are brought out of engagement. This releases the resilient means 52 to actuate the locking slide 45 into its floating position 53 at the same time as the selector lever 7 is locked by the engagement of blocking and counter-blocking cam 11 and 12. The ignition lock is thus brought into the key withdrawal position 42 under spring action.

In the embodiment of FIG. 5, the selector lever 7 is additionally lockable in the neutral position (N) as a function of the position of the brake pedal 8, i.e. the actuation of the selector lever 7 out of the neutral position (N) is only possible with the brake pedal 8 depressed. For this purpose, the cam disk part 34 of the selector lever 7 has on its outer periphery a control cam 20 (adjoining the blocking cam 11 associated with the park position (P)), which is associated with the nonlockable shift position (R) of the reverse gear. Next to this control cam 20 is a notch with blocking cam faces 22 and 23 situated opposite one another in the circumferential directions. The last mentioned blocking cam face 23 is followed in the circumferential direction by control cam face 18 for the other nonlockable positioned (D), (3) and (2).

The selector lever 7 is once again swivellably mounted about the swivelling axis 33 and the cam disk part 34 is arranged concentrically to the swivelling axis 33 so as to be secure against movement relative to the selector lever 7. The locking element 10, which cooperates with the adjusting linkage 9 and the resilient means 17 in the manner already described, is designed as a two-armed reversing lever which is swivellably mounted at a central point by means of the joint 66. One lever arm 86 is connected in articulated fashion to the linkage end 32 of the adjusting linkage 9 and the other lever arm 87 acts as latch-like counter-blocking cam 12 and also as counter-control cam.

The locking element 10 is once again actuable out of the shown locking position 14 (neutral position (N)) into a floating position 15 by the resilient means 17 supported between an abutment 67 fixed to the vehicle and a spring plate 68 secure against movement relative to the linkage end 32. When locking element 10 is engaged in the notch (blocking position), blocking cam face 22 prevents actuation in the direction of the (R) position and blocking cam face 23 blocks an actuation of the selector lever 7 in the direction of the (D) position.

In the (R) position of the selector lever 7, the latch-like counter-blocking cam 12 cooperates with control cam 20. In the (D), (3) and (2) positions, the counter-blocking cam 12 cooperates with control cam 18 in exactly the same as in the first embodiment of FIG. 1. The counter-control cam 21 cooperates with the control cam 18 in the nonlockable positions (R), (N), (D), (3) and (2). In order not to block normal shifts via the selector lever 7 during driving (in which shifts the (N) position is included) it is advantageous to provide cancellation of the brake-pedal-dependent locking above a minimum value of the driving speed using the arrangement according to FIG. 3.

A further development of the embodiment of FIG. 5 has brake-pedal-dependent locking both in the park position (P) and in the neutral position (N) is found in the embodiment of FIG. 6. As in the embodiment of FIG. 4, locking of the park position (P) additionally as a function of the position of the ignition lock via the intermediary of an ignition-lock-dependent locking device 41 is provided and which, except for the position of the coupling of the adjusting linkage 51 to the selector lever 7 and the design of said coupling, is identical to the locking device 41 of FIG. 4.

The adjusting linkage 51 of the ignition-lock-dependent locking device 41 is articulated by its linkage end 88 (opposite to the locking slide 45) at a second locking element 61, which is swivellably suspended about joint 89 (in proximity to the cam disk part 34) on a carrier part fixed to the vehicle. A latch-like counter-blocking cam 90 cooperates with a second blocking cam 60 on the camshaft part 34 associated with the park position (P) and with a control cam 91, which is associated with the positions (R), (N), (D), (3) and (2) which are not lockable as a function of the ignition lock.

The locking element 61 is actuable by resilient means 92, supported between an abutment 93 fixed to the vehicle and a spring plate 94 fixed in relation to the linkage end 88, out of a blocking position 95 (in which blocking and counter-blocking cam 60 and 90 are in engagement) into the shown floating position 96 in which the control cam 91 and the latch-like part 90 of the locking element 61, are in engagement. Here the part 9 acts as a counter control cam. In the neutral position (N), the locking slide 45 is held in its locking position 50 by control and counter-control cam 91 and 90, the key withdrawal position 42 thereby being blocked and the lock cylinder core being in the blocking position 85 when the engine is switched off. By depressing the brake pedal, the locking 12, 22 is released via the adjusting linkage 9 to enable the selector lever 7 to be brought into the park position (P). The counter effect on the resilient means 52 thereby ceases so that resilient means can actuate the locking slide 45 into the floating position 53 and because the resilient means 92 are weaker, actuates the locking element 61 into the locking position 95.

The locking device 41 and its interaction with a swivellable locking element acting on the selector lever 7 corresponding to the embodiment of FIG. 6, forms the subject matter of the applicant's corresponding patent application Ser. No. 07/430,639 filed Oct. 31, 1989 which is incorporated by reference herein.

In the case of the brake-pedal-dependent locking device, the resilient means 17 can act directly on the swivellable locking element 10 and the linkage 9 can thus also be a cable pull.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for locking an actuating lever of a gear shifting device of a gear-change mechanism of a motor vehicle;
   the vehicle having brakes actuable by a brake pedal;
   wherein said device for locking includes a locking means provided to lock the actuating lever in a position associated with a particular shift state as a function of a position of the brake pedal;
   wherein the actuating lever is swivellably mounted on the vehicle;
   wherein the locking means is connected with the brake pedal via a mechanical adjusting linkage;
   wherein the locking means and the actuating lever are arranged in proximity to one another;
   wherein the locking means comprises positively engaging blocking and corresponding counter-blocking members;
   wherein one of the counter-blocking or blocking members moves with the actuating lever;
   wherein the mechanical adjusting linkage between the locking means and the brake pedal is moved by a restoring spring means, that holds the brake pedal in an unactuated rest position, into a locking position to hold the blocking and counter-blocking members in engagement by the brake pedal;
   wherein, when the brake pedal is depressed to actuate the brakes, a spring force of the restoring spring is overcome and the mechanical adjusting link is moved to adjust the locking means into a floating position bringing the blocking and counter-blocking members out of engagement;
   wherein the mechanical adjusting linkage includes a resiliently-acting intermediate lever means for changing an effective linkage length of the mechanical adjusting linkage;
   wherein the intermediate lever means is provided with a bias spring having a lower spring force than the restoring spring;
   wherein the actuating lever has nonlockable lever positions associated with other particular shift states;
   wherein in the unactuated position of the brake pedal, the locking means is held in its floating position by actuation of the actuating lever between nonlockable lever positions such that the spring bias force of the intermediate member is overcome and the mechanical linkage has its length changed so that the brake pedal remains essentially in its rest position;
   wherein the mechanical adjusting linkage is flexible;
   wherein one of the blocking and counter block members is swivellably mounted and actuable by a first resilient means into the floating position;
   wherein the resilient means has a spring force less than the bias spring force of the intermediate member;
   wherein the intermediate member has two levers which are mounted about a common swivelling axis and are held relative to one another by the bias spring in an end position of an angle of rotation determined by stop and counter-stop means;
   wherein one of the two levers of the intermediate member is brought into engagement with the brake pedal by the bias spring; and
   wherein a linkage end of the mechanical adjusting linkage cooperates with the other lever.

2. A device according to claim 1, wherein the actuating lever is connected to a cam disk part which is arranged concentrically to a swivelling axis of the actuating lever; and
   wherein the one of counter-blocking members that moves with the actuating lever is a blocking and control cam on the cam disk part.

3. A device according to claim 1, wherein the one of the two levers of the intermediate member is connected both by a releasable frictional connection and by an adjusting spring to a cam lever mounted to be swivellable about a swivelling axis of the intermediate member;
   wherein the adjusting spring is connected such that a line of force of the adjusting spring and its connection to the two levers relative to the swivelling axis with the frictional connection released, allows the cam lever to move up against the brake pedal while the one lever of the two levers of the fixed intermediate member is moved relative to the vehicle.

4. A device according to claim 2, wherein the one of the two levers of the intermediate member is connected both by a releasable frictional connection and by an adjusting spring to a cam lever mounted to be swivellable about a swivelling axis of the intermediate member;
   wherein the adjusting spring is connected such that a line of force of the adjusting spring and its connection to the two levers relative to the swivelling axis with the frictional connection released, allows the cam lever to move up against the brake pedal while the one lever of the two levers of the fixed intermediate member is moved relative to the vehicle.

5. A device according to claim 1, wherein the locking element means is actuated into its floating position, irrespective of the position of the brake pedal by an actuator means operating in response to driving speed of the vehicle.

6. A device according to claim 5, wherein the actuator means is arranged in proximity to the brake pedal and acts on the linkage end of the mechanical adjusting linkage that connects the intermediate member to the locking element.

7. A device according to claim 1, wherein the actuating lever has a second lockable lever position which causes actuation of the locking means as a function of the position of an ignition lock means by a locking device dependent on an ignition key position of the ignition lock means;

wherein the ignition lock means is provided with a single fixed angular position of a lock cylinder core for key withdrawal;

wherein the locking device comprises a camshaft part actuable by the ignition key;

a blocking cam on the camshaft part;

a locking slide displaceable perpendicularly to an axis of rotation of the camshaft part;

a corresponding counter-blocking cam on the locking slide;

a control cam and corresponding counter-control cam on the camshaft part;

a cam on the slide;

wherein, when the ignition lock is actuated in the direction of a driving position, the locking slide moves into a locking position in which the counter-blocking cam lies in the path of motion of the blocking cam and thereby blocks the ignition lock means from reaching a key withdrawal position;

wherein a second flexible mechanical adjusting linkage is provided for the transmission of tensile and compressive forces from the locking slide to the intermediate lever means;

wherein the locking slide can be actuated by second resilient means into a floating position in which its counter-blocking cams lies outside a path of motion of the blocking cam so that the lock cylinder core is thus free to reach the key withdrawal position;

wherein the second resilient means is designed with a higher spring force than the first resilient means;

wherein the second adjusting linkage is connected to the intermediate lever means by a lost motion linkage connection permitting an idle path;

wherein the one swivellable locking element can be actuated into its locking position by the second resilient means when the locking slide is in a floating position;

wherein the lost motion idle path allows the brake pedal to be located in its rest position at the same time as both the one swivellable locking element and the locking slide are each in their respective locking position;

wherein when the one swivellable locking element is actuated into the floating position, the locking slide is brought into its locking position to allow the lock cylinder means to move into its key withdrawal position irrespective of the position of the brake pedal only in the lockable lever position of the actuating lever and wherein the actuating lever is locked in its lockable lever position when the lock cylinder means is in its key withdrawal position irrespective of the position of the brake pedal.

8. A device according to claim 2, wherein the actuating lever has a second lockable lever position which causes actuation of the locking means as a function of the position of an ignition lock means by a locking device dependent on an ignition key position of the ignition lock means;

wherein the ignition lock means is provided with a single fixed angular position of a lock cylinder core for key withdrawal;

wherein the locking device comprises a camshaft part actuable by the ignition key;

a blocking cam on the camshaft part;

a locking slide displaceable perpendicularly to an axis of rotation of the camshaft part;

a corresponding counter-blocking cam on the locking slide;

a control cam and corresponding counter-control cam on the camshaft part;

a cam on the slide;

wherein, when the ignition lock is actuated in the direction of a driving position, the locking slide moves into a locking position in which the counter-blocking cam lies in the path of motion of the blocking cam and thereby blocks the ignition lock means from reaching a key withdrawal position;

wherein a second flexible mechanical adjusting linkage is provided for the transmission of tensile and compressive forces from the locking slide to the intermediate lever means;

wherein the locking slide can be actuated by second resilient means into a floating position in which its counter-blocking cam lies outside a path of motion of the blocking cam so that the lock cylinder core is thus free to reach the key withdrawal position;

wherein the second resilient means is designed with a higher spring force than the first resilient means;

wherein the second adjusting linkage is connected to the intermediate lever means by a lost motion linkage connection permitting an idle path;

wherein the one swivellable locking element can be actuated into its locking position by the second resilient means when the locking slide is in a floating position;

wherein the lost motion idle path allows the brake pedal to be located in its rest position at the same time as both the one swivellable locking element and the locking slide are each in their respective locking position;

wherein when the one swivellable locking element is actuated into the floating position, the locking slide is brought into its locking position to allow the lock cylinder means to move into its key withdrawal position irrespective of the position of the brake pedal only in the lockable lever position of the actuating lever and wherein the actuating lever is locked in its lockable lever position when the lock cylinder means is in its key withdrawal position irrespective of the position of the brake pedal.

9. A device according to claim 3, wherein the actuating lever has a second lockable lever position which causes actuation of the locking means as a function of the position of an ignition lock means by a locking device dependent on an ignition key position of the ignition lock means;
   wherein the ignition lock means is provided with a single fixed angular position of a lock cylinder core for key withdrawal;
   wherein the locking device comprises a camshaft part actuable by the ignition key;
   a blocking cam on the camshaft part;
   a locking slide displaceable perpendicularly to an axis of rotation of the camshaft part;
   a corresponding counter-blocking cam on the locking slide;
   a control cam and corresponding counter-control cam on the camshaft part;
   a cam on the slide;
   wherein, when the ignition lock is actuated in the direction of a driving position, the locking slide moves into a locking position in which the counter-blocking cam lies in the path of motion of the blocking cam and thereby blocks the ignition lock means from reaching a key withdrawal position;
   wherein a second flexible mechanical adjusting linkage is provided for the transmission of tensile and compressive forces from the locking slide to the intermediate lever means;
   wherein the locking slide can be actuated by second resilient means into a floating position in which its counter-blocking cam lies outside a path of motion of the blocking cam so that the lock cylinder core is thus free to reach the key withdrawal position;
   wherein the second resilient means is designed with a higher spring force than the first resilient means;
   wherein the second adjusting linkage is connected to the intermediate lever means by a lost motion linkage connection permitting an idle path;
   wherein the one swivellable locking element can be actuated into its locking position by the second resilient means when the locking slide is in a floating position;
   wherein the lost motion idle path allows the brake pedal to be located in its rest position at the same time as both the one swivellable locking element and the locking slide are each in their respective locking position;
   wherein when the one swivellable locking element is actuated into the floating position, the locking slide is brought into its locking position to allow the lock cylinder means to move into its key withdrawal position irrespective of the position of the brake pedal only in the lockable lever position of the actuating lever and
   wherein the actuating lever is locked in its lockable lever position when the lock cylinder means is in its key withdrawal position irrespective of the position of the brake pedal.

10. A device according to claim 4, wherein the actuating lever has a second lockable lever position which causes actuation of the locking means as a function of the position of an ignition lock means by a locking device dependent on an ignition key position of the ignition lock means;
   wherein the ignition lock means is provided with a single fixed angular position of a lock cylinder core for key withdrawal;
   wherein the locking device comprises a camshaft part actuable by the ignition key;
   a blocking cam on the camshaft part;
   a locking slide displaceable perpendicularly to an axis of rotation of the camshaft part;
   a corresponding counter-blocking cam on the locking slide;
   a control cam and corresponding counter-control cam on the camshaft part;
   a cam on the slide;
   wherein, when the ignition lock is actuated in the direction of a driving position, the locking slide moves into a locking position in which the counter-blocking cam lies in the path of motion of the blocking cam and thereby blocks the ignition lock means from reaching a key withdrawal position;
   wherein a second flexible mechanical adjusting linkage is provided for the transmission of tensile and compressive forces from the locking slide to the intermediate lever means;
   wherein the locking slide can be actuated by second resilient means into a floating position in which its counter-blocking cam lies outside a path of motion of the blocking cam so that the lock cylinder core is thus free to reach the key withdrawal position;
   wherein the second resilient means is designed with a higher spring force than the first resilient means;
   wherein the second adjusting linkage is connected to the intermediate lever means by a lost motion linkage connection permitting an idle path;
   wherein the one swivellable locking element can be actuated into its locking position by the second resilient means when the locking slide is in a floating position;
   wherein the lost motion idle path allows the brake pedal to be located in its rest position at the same time as both the one swivellable locking element and the locking slide are each in their respective locking position;
   wherein when the one swivellable locking element is actuated into the floating position, the locking slide is brought into its locking position to allow the lock cylinder means to move into its key withdrawal position irrespective of the position of the brake pedal only in the lockable lever position of the actuating lever and
   wherein the actuating lever is locked in its lockable lever position when the lock cylinder means is in its key withdrawal position irrespective of the position of the brake pedal.

11. A device according to claim 5, wherein the actuating lever has a second lockable lever position which causes actuation of the locking means as a function of the position of an ignition lock means by a locking device dependent on an ignition key position of the ignition lock means;
   wherein the ignition lock means is provided with a single fixed angular position of a lock cylinder core for key withdrawal;
   wherein the locking device comprises a camshaft part actuable by the ignition key;
   a blocking cam on the camshaft part;
   a locking slide displaceable perpendicularly to an axis of rotation of the camshaft part;
   a corresponding counter-blocking cam on the locking slide;
   a control cam and corresponding counter-control cam on the camshaft part;
   a cam on the slide;
   wherein, when the ignition lock is actuated in the direction of a driving position, the locking slide moves into a locking position in which the counter-blocking cam lies in the path of motion of the blocking cam and thereby blocks the ignition lock means from reaching a key withdrawal position;

wherein a second flexible mechanical adjusting linkage is provided for the transmission of tensile and compressive forces from the locking slide to the intermediate lever means;

wherein the locking slide can be actuated by second resilient means into a floating position in which its counter-blocking cam lies outside a path of motion of the blocking cam so that the lock cylinder core is thus free to reach the key withdrawal position;

wherein the second resilient means is designed with a higher spring force than the first resilient means;

wherein the second adjusting linkage is connected to the intermediate lever means by a lost motion linkage connection permitting an idle path;

wherein the one swivellable locking element can be actuated into its locking position by the second resilient means when the locking slide is in a floating position;

wherein the lost motion idle path allows the brake pedal to be located in its rest position at the same time as both the one swivellable locking element and the locking slide are each in their respective locking position;

wherein when the one swivellable locking element is actuated into the floating position, the locking slide is brought into its locking position to allow the lock cylinder means to move into its key withdrawal position irrespective of the position of the brake pedal only in the lockable lever position of the actuating lever and wherein the actuating lever is locked in its lockable lever position when the lock cylinder means is in its key withdrawal position irrespective of the position of the brake pedal.

12. A device according to claim 7, wherein the lost motion connection contains a sliding joint.

13. A device according to claim 7, wherein the other of the two levers of the resiliently-acting intermediate member is designed as a two-armed reversing lever;

wherein the mechanical adjusting linkage is connected to one lever arm of the reversing lever; and wherein the second adjusting linkage is connected to the other lever arm.

14. A device according to claim 11, wherein the other of the two levers of the resiliently-acting intermediate member is designed as a two-armed reversing lever;

wherein the mechanical adjusting linkage is connected to one lever arm of the reversing lever; and wherein the second adjusting linkage is connected to the other lever arm.

15. A device according to claim 1, wherein the counter-blocking or blocking member that moves with the actuating lever is configured as a control cam means lying between two blocking cams means for providing a nonlockable lever position lying between two lockable lever positions.

16. A device according to claim 1, wherein the actuating lever has a second lockable lever position which causes actuation of the locking means as a function of the position of an ignition lock means through an additional second blocking cam moved by the actuating lever and a swivellable locking element connected to an ignition locking device;

wherein the actuating lever is locked in this second lockable lever position by actuation of an ignition lock in a key withdrawal position; and wherein actuation of the ignition lock into the key withdrawal position is blocked by the actuating lever when the actuating lever is not in the second lever position lockable as a function of the position of the ignition lock.

17. A device according to claim 7, wherein the actuating lever has a second lockable lever position which causes actuation of the locking means as a function of the position of an ignition lock means through an additional second blocking cam moved by the actuating lever and a swivellable locking element connected to an ignition locking device;

wherein the actuating lever is locked in this second lockable lever position by actuation of an ignition lock in a key withdrawal position; and wherein actuation of the ignition lock into the key withdrawal position is blocked by the actuating lever when the actuating lever is not in the second lever position lockable as a function of the position of the ignition lock.

18. A device according to claim 16, wherein the one of the blocking or counter-blocking members moved by the actuating lever is a cam disk part which is provided with two blocking cams operating during the second position to be locked as a function of the position of the ignition lock.

19. A device according to claim 16, wherein the locking device comprises a second blocking cam on a camshaft part which is actuable by an ignition key rotating against a third resilient means;

wherein said second blocking cam is mounted in alignment with and rotatable relative to an axis of rotation of the ignition lock means;

wherein said second blocking cam cooperates with a second locking element which is displaceably arranged on a fixed housing part of the locking device;

wherein said second locking element is kinematically connected to one linkage end of a second mechanical adjusting linkage;

wherein another linkage end of the second mechanical adjusting linkage is kinematically connected to a further locking element, which is mounted in proximity to the manual selector lever so as to swivel on a housing part fixed to the vehicle and which cooperates with a third blocking cam, said third cam moved by the actuating lever through a third counter-blocking means;

wherein the particular shift state is a park position;

wherein the ignition lock has only one fixed angular position in which the ignition key can be brought into or out of engagement with the ignition lock;

wherein the second blocking cam and locking element are only in alignment when the selecting lever is in the park position such that the ignition lock can be brought into the rest position;

wherein when the ignition lock is in the rest position, the manual selector lever is positively locked in its park position;

wherein the third blocking cam of the manual selector lever is decoupled from the third counter-blocking means by a third resilient means when the manual selector lever is not in the park position;

wherein the camshaft part penetrates into an opening of a frame-shaped slide of the displaceable locking element and has an additional control cam that can be brought into engagement with an additional counter-blocking cam on the slide;

wherein the additional counter-blocking cam and a counter-control cam of the locking element extend radially to the axis of rotation of the camshaft part and are arranged at diametrically opposite points of the slide in relation to the camshaft part;

wherein the additional counter-blocking cam lies at a differential angle of rotation before an angular position, corresponding to a rest position of the second blocking cam of the camshaft part;

wherein the additional counter-blocking cam can be brought out of engagement with the second blocking cam of the camshaft part by the third resilient means counteracting the actuation by the ignition lock;

wherein the third resilient means counteracting the actuation of the camshaft part by the ignition lock is designed with a higher spring force than the resilient means acting on the swivellable locking element to produce a decoupling from the blocking cam of the manual selector lever; and wherein when the control cam of the camshaft part is actuated into an angular position corresponding to a driving position of the ignition lock, it comes into engagement with the counter-control cam such that the counter-blocking cam of the slide lies in the path of motion of the blocking cam of the camshaft part and the swivellable locking element is decoupled from the blocking cam of the manual selector lever.

20. A device according to claim 18, wherein the locking device comprises a second blocking cam on a camshaft part which is actuable by an ignition key rotating against a third resilient means;

wherein said second blocking cam is mounted in alignment with and rotatable relative to an axis of rotation of the ignition lock means;

wherein said second blocking cam cooperates with a second locking element which is displaceably arranged on a fixed housing part of the locking device;

wherein said second locking element is kinematically connected to one linkage end of a second mechanical adjusting linkage;

wherein another linkage end of the second mechanical adjusting linkage is kinematically connected to a further locking element, which is mounted in proximity to the manual selector lever so as to swivel on a housing part fixed to the vehicle and which cooperates with a third blocking cam, said third cam moved by the actuating lever through a third counter-blocking means;

wherein the particular shift state is a park position;

wherein the ignition lock has only one fixed angular position in which the ignition key can be brought into or out of engagement with the ignition lock;

wherein the second blocking cam and locking element are only in alignment when the selecting lever is in the park position such that the ignition lock can be brought into the rest position;

wherein when the ignition lock is in the rest position, the manual selector lever is positively locked in its park position;

wherein the third blocking cam of the manual selector lever is decoupled from the third counter-blocking means by a third resilient means when the manual selector lever is not in the park position;

wherein the camshaft part penetrates into an opening of a frame-shaped slide of the displaceable locking element and has an additional control cam that can be brought into engagement with an additional counter-blocking cam on the slide;

wherein the additional counter-blocking cam and a counter-control cam of the locking element extend radially to the axis of rotation of the camshaft part and are arranged at diametrically opposite points of the slide in relation to the camshaft part;

wherein the additional counter-blocking cam lies at a differential angle of rotation before an angular position, corresponding to a rest position of the second blocking cam of the camshaft part wherein the additional counter-blocking cam can be brought out of engagement with the second blocking cam of the camshaft part by the third resilient means counteracting the actuation by the ignition lock wherein the third resilient means counteracting the actuation of the camshaft part by the ignition lock is designed with a higher spring force than the resilient means acting on the swivellable locking element to produce a decoupling from the blocking cam of the manual selector lever; and wherein when the control cam of the camshaft part is actuated into an angular position corresponding to a driving position of the ignition lock, it comes into engagement with the counter-control cam such that the counter-blocking cam of the slide lies in the path of motion of the blocking cam of the camshaft part and the swivellable locking element is decoupled from the blocking cam of the manual selector lever.

* * * * *